(12) United States Patent
Yano

(10) Patent No.: US 7,452,559 B2
(45) Date of Patent: Nov. 18, 2008

(54) METHOD OF IMPROVING BEEF QUALITY

(75) Inventor: Hideo Yano, Kyoto (JP)

(73) Assignee: Kansai Technology Licensing Organization Co., Ltd., Kyoto (JP)

( * ) Notice: Subject to any disclaimer, the term of this patent is extended or adjusted under 35 U.S.C. 154(b) by 693 days.

(21) Appl. No.: 10/250,785

(22) PCT Filed: Jan. 18, 2002

(86) PCT No.: PCT/JP02/00306

§ 371 (c)(1),
(2), (4) Date: Dec. 3, 2003

(87) PCT Pub. No.: WO02/056704

PCT Pub. Date: Jul. 25, 2002

(65) Prior Publication Data

US 2004/0071819 A1  Apr. 15, 2004

(30) Foreign Application Priority Data

Jan. 19, 2001  (JP) .............................. 2001-011122

(51) Int. Cl.
*A23L 1/302* (2006.01)
*A23K 1/18* (2006.01)

(52) U.S. Cl. .............................. 426/72; 426/2; 426/302; 426/807

(58) Field of Classification Search .................. 426/72, 426/2, 807, 302
See application file for complete search history.

(56) References Cited

U.S. PATENT DOCUMENTS

| 2,807,546 | A | * | 9/1957 | Anderson et al. ............ 426/311 |
| 3,042,529 | A | * | 7/1962 | Radouco-Thoma ............. 426/2 |
| 3,600,187 | A | * | 8/1971 | Elenbogen ................. 426/311 |
| 4,016,292 | A | * | 4/1977 | Hood ............................. 426/2 |

FOREIGN PATENT DOCUMENTS

| JP | A 6-22704 | 2/1994 |
| JP | A 6-169726 | 6/1994 |
| JP | A 7-132050 | 5/1995 |
| JP | A 10-113129 | 5/1998 |
| JP | A 11-196776 | 7/1999 |
| JP | 2000-281575 A | * 10/2000 |
| JP | A 2000-281575 | 10/2000 |
| JP | A 2001-169731 | 6/2001 |
| JP | A 2002-194 | 1/2002 |
| WO | WO 00/44236 | 8/2000 |

OTHER PUBLICATIONS

Oohashi et al., Research Bulletin of the Aichi-ken Agricultural Research Center, (Dec. ☐☐ 1999) No. 31, pp. 245-252.*
Ohashi et al., Res. Bull. Aichi Agric. Res. Ctr., vol. 32, (2000), pp. 207-214—translation.*
Ohashi et al., Res. Bull. Aichi Agric. Res. Ctr., vol. 118, Issue 31, (1999), pp. 245-252—translation.*
Shin-ichiro Torrii et al.; "Effect of Vitamin A, C, and D on Glycerol-3-Phosphate Dehydrogenase Activity of Sheep Preadiocytes in Primary Culture"; Animal Science and Technology,; vol. 66, No. 12; Dec. 1995; pp. 1039-1042.
Eiji Takahashi et al.; "Serum Vitamin C Concentration in Fattening and Fattened Beef Cattle"; Animal Science Journal; vol. 70, No. 8; Apr. 1999; pp. J119-J122.

* cited by examiner

*Primary Examiner*—C. Sayala
(74) *Attorney, Agent, or Firm*—Oliff & Berridge, PLC

(57) ABSTRACT

The present invention is made for the purpose of improving beef quality and upgrading its fat marbling standard (which is called beef marbling standard, or BMS). The fat marbling state is generally called "Shimofuri" in Japanese. This purpose is achieved by vitamin C administration (L-ascorbic acid) to the cattle. The vitamin C can be administered by injection etc., but the easiest way is by oral administration. When only the vitamin C is administered orally, however, it is decomposed by microorganisms in the rumen and the desired effect cannot be obtained. For that reason, the vitamin C needs to be coated with something so that it can be absorbed by the intestinal tract after passing through the stomach. Soybean-hydrogenated oil and fat is desirable for such covering material. An appropriate daily dose of the vitamin C is approximately 20 mg to 60 mg/kg of weight. According to the result of tests conducted on the Japanese Black Cattle, in terms of the yield, there is no significant difference between the cattle given the vitamin C and those not given it. In terms of the quality of the meat, however, there are significant differences in the fat marbling (Shimofuri), luster, firmness and texture of the meat.

4 Claims, 2 Drawing Sheets

Fig. 1

YIELD

| Group | No. | Yield | | | | | | | Yield Grade |
|---|---|---|---|---|---|---|---|---|---|
| | | Weight of Dressed Carcass (Left) (kg) | Weight of Dressed Carcass(Right)(kg) | Weight of Dressed Carcass (kg) | Area of Rib Eye (cm2) | Thickness of Flank (cm) | Thickness of Subcutaneous Fat (cm) | Standard Value of Yield | |
| Test Group | 1 | 201.5 | 199.3 | 400.8 | 56.0 | 8.4 | 2.4 | 75.1 | A |
| | 2 | 217.0 | 211.8 | 428.8 | 62.0 | 7.8 | 2.5 | 76.0 | A |
| | 3 | 248.2 | 244.7 | 492.9 | 54.0 | 9.2 | 2.4 | 74.2 | A |
| | 4 | 213.4 | 211.8 | 425.2 | 58.0 | 8.8 | 1.5 | 70.1 | A |
| | Average | 220.03 | 216.90 | 436.93 | 57.50 | 8.55 | 2.20 | 73.85 | |
| | Standard Deviation | 19.92 | 19.45 | 39.33 | 3.42 | 0.60 | 0.47 | 2.61 | |
| Control Group | 1 | 179.5 | 179.3 | 358.8 | 48.0 | 6.8 | 2.4 | 73.6 | A |
| | 2 | 213.6 | 215.6 | 429.2 | 51.0 | 7.9 | 2.2 | 74.0 | A |
| | 3 | 248.0 | 243.5 | 491.5 | 67.0 | 8.8 | 1.7 | 76.3 | A |
| | 4 | 234.0 | 233.6 | 467.6 | 53.0 | 8.2 | 1.8 | 74.3 | A |
| | Average | 218.78 | 218.00 | 436.78 | 54.75 | 7.93 | 2.03 | 74.55 | |
| | Standard Deviation | 29.75 | 28.27 | 57.97 | 8.42 | 0.84 | 0.33 | 1.20 | |

Fig. 2

MEAT QUALITY

| Group | No. | Standard Value of Fat Marbling | BMS No. | Grade of Fat Marbling | Meat Quality ||||||||||| Grade of Meat Quality |
|---|---|---|---|---|---|---|---|---|---|---|---|---|---|---|
| | | | | | BCS No. | Luster | Grade | Firmness | Texture | Grade | BFS No. | Luster and Quality | Grade | |
| Test Group | 1 | 1.33 | 5 | 4 | 3 | 4 | 4 | 4 | 4 | 4 | 3 | 5 | 5 | 4 |
| | 2 | 2.00 | 7 | 4 | 3 | 4 | 4 | 5 | 5 | 5 | 3 | 5 | 5 | 4 |
| | 3 | 1.33 | 5 | 4 | 3 | 4 | 4 | 4 | 4 | 4 | 3 | 5 | 5 | 4 |
| | 4 | 1.67 | 6 | 4 | 4 | 4 | 4 | 4 | 4 | 4 | 3 | 5 | 5 | 4 |
| | Average | 1.58 | 5.8 | 4.0 | 3.3 | 4.0 | 4.0 | 4.3 | 4.3 | 4.3 | 3.0 | 5.0 | 5.0 | |
| | Standard Deviation | 0.32 | 1.0 | 0.0 | 0.5 | 0.0 | 0.0 | 0.5 | 0.5 | 0.5 | 0.0 | 0.0 | 0.0 | |
| Control Group | 1 | 0.33 | 2 | 2 | 3 | 3 | 3 | 3 | 3 | 3 | 3 | 5 | 5 | 2 |
| | 2 | 0.67 | 3 | 3 | 3 | 3 | 3 | 3 | 3 | 3 | 3 | 5 | 5 | 3 |
| | 3 | 1.00 | 4 | 3 | 3 | 3 | 3 | 3 | 3 | 3 | 3 | 5 | 5 | 3 |
| | 4 | 1.00 | 4 | 3 | 4 | 3 | 3 | 4 | 4 | 4 | 3 | 5 | 5 | 3 |
| | Average | 0.75 | 3.3 | 2.8 | 3.3 | 3.0 | 3.0 | 3.3 | 3.3 | 3.3 | 3.0 | 5.0 | 5.0 | |
| | Standard Deviation | 0.32 | 1.0 | 0.5 | 0.5 | 0.0 | 0.0 | 0.5 | 0.5 | 0.5 | 0.0 | 0.0 | 0.0 | |

METHOD OF IMPROVING BEEF QUALITY

TECHNICAL FIELD

The present invention relates to a method of improving beef quality and upgrading its fat marbling standard (which is called beef marbling standard, or BMS). The fat marbling state is generally called "Shimofuri" in Japanese.

BACKGROUND ART

Although fat-marbled beef (i.e. beef with an intermingling or dispersion of fat within it) is in great demand especially in Japan because of its tenderness, fine texture, etc., the problem is that it is difficult to produce. Therefore, in recent years, research in the production of the fat-marbled beef has been conducted not only in Japan but also overseas.

Many proposals to improve beef quality have been presented so far. For example, the Japanese Unexamined Patent Publication No. H6-22704 describes a method to improve the quality grade of beef, its fat marbling, firmness, flavor, tenderness, etc. by supplying feed containing calcium salt of fatty acid having a specific composition to cattle. Another method described in the Japanese Unexamined Patent Publication No. H06-169726 is to apply water-soluble magnesium oxide and metal chlorophyllin to cattle. By this method, when the meat is cooled during the processing of dressed carcasses after slaughter, myoglobin turns back into oxidized myoglobin by the oxygen remaining in its tissues, thus having good effects on the meat color, luster, etc. According to the Japanese Unexamined Patent Publication No. H07-132050, a daily intake of turmeric powder of approximately 0.1 g to 0.4 g per 10 kg of weight can prevent liver abscesses and its complications such as hepatization and liver congestion, which are frequently found in commercial cattle from the later raising stage to the fattening stage. With this improvement of hepatic function, the quality of the meat can be also enhanced. The Japanese Unexamined Patent Publication No. H10-113129 describes feed composed of metallic salt of fatty acid including unsaturated fatty acid and phosphorus compound optionally with antioxidant. This feed greatly contributes to improving the quality of beef, the gaining of body weight, etc. in a variety of breeds such as Japanese Black Cattle, Holstein and F1. In the Japanese Unexamined Patent Publication No. H11-196776, supplying feed mixed with spices and vitamin E enables the production of beef which can be kept fresh for a long time as well as reduce its drip and thus can lead to its improved flavor.

The present invention provides a simple method of improving beef quality and upgrading its fat marbling standard, differently from those mentioned above.

DISCLOSURE OF THE INVENTION

A method of improving beef quality according to the present invention is characterized by giving vitamin C (i.e. L-ascorbic acid) to cattle.

Such ruminants as cattle have been conventionally known to synthesize vitamin C in their bodies. There are only a few reports mentioned about giving vitamin C to cattle with a well-developed ruminant stomach. Research conducted by the present inventor and others, however, indicated that the level of serum vitamin C in commercial cattle decreases as they become fatter in the fattening process and some cattle may even suffer from vitamin C deficiency (Takahashi Eiji et al., "Hiikugyu ni-okeru Kesseichu Vitamin C Nodo" [Serum Vitamin C Concentration in Fattening and Fattened Beef Cattle] in *Animal Science Journal* vol. 70 (1999) No. 8, p. J119). The Japanese Unexamined Patent Publication No. 2000-281575 describes giving oil-coated vitamin C to cattle etc. to develop the resistance to stress during the fattening period and to boost the immune ability to cold etc.

In the meanwhile, it is known that various kinds of vitamins affect adipose cell differentiation. The present inventor and others studied the effects of various kinds of vitamins on cultured adipose precursor cells derived from sheep and thus found that the vitamin C activates glycerol trophosphate dehydrogenase (or GPHD), which is an indicator of the differentiation into adipose cells (Torii Shinichiro et al., "Vitamin A, C oyobi D ga Hitsuji-Yurai-Baiyo-Shibo-Zenku-Saibo no Glycerol-3-phosphate Dehydrogenase Kassei ni Oyobosu Eikyo" [Effect of Vitamin A, C and D on Glycerol-3-phosphate Dehydrogenase Activity of Sheep Preadiocytes in Primary Culture] in *Animal Science Journal* vol. 66 (1995) No. 12, p. 1039).

However, there has been no research on how the administration of vitamin C practically affects the quality of beef as commercial products. The present inventor focused on this point and conducted various experiments. As a result, the proper administration of vitamin C was discovered to be remarkably effective for the improvement of the quality of beef, especially the degree of its fat marbling (Shimofuri). This had not been conventionally known to those skilled in the art. Therefore, the knowledge of the above technology of the present invention can make significant contributions to nurturing industries in the present field.

The vitamin C can be administered by injection etc., but the easiest way is by oral administration. When only the vitamin C is administered orally, however, it is decomposed by microorganisms in the rumen and the desired effect cannot be obtained. For that reason, the vitamin C needs to be coated with something so that it can be absorbed by the intestinal tract after passing thorough the stomach. For such coating material, any kind of substance less subject to the decomposition in the rumen such as oils and fats of plant and animal origin, ethylcellulose, and silicone can be used. Hydrogenated oil and fat, which melts at relatively high temperature compared to other oils and fats, is desirable. From the viewpoint of stability and preference, soybean-hydrogenated oil and fat is particularly desirable.

It is desirable that the coated vitamin C should be administered to the cattle during the fattening period, especially from the middle to the later fattening stage, during which the adipose cell differentiation occurs. A desirable dose of the vitamin C (L-ascorbic acid) is 20 mg to 60 mg/kg of weight per day, and the most ideal is approximately 40 mg/kg of weight per day.

By this method of the present invention, at a relatively low cost, the beef quality can be improved and its fat marbling (i.e. Shimofuri) standard can be also upgraded, thus endowing the beef with great price competitiveness. Consequently, it is possible to generate proceeds exceeding the administration cost. In addition, the oral administration is simple enough to conduct with ease.

BRIEF DESCRIPTION OF THE DRAWINGS

FIG. 1 is a table showing the effects of a feed additive as an embodiment of the present invention on yield.

FIG. 2 is a table showing the effects of a feed additive as an embodiment of the present invention on beef quality.

BEST MODE FOR CARRYING OUT THE INVENTION

As an embodiment of the present invention, a feed additive for oral administration is explained. This additive is vitamin C whose surface is coated with soybean-hydrogenated oil.

Its production method is as follows. First, 300 kg of vitamin C (product of Takeda Chemical Industries, Ltd.) and 30 kg of soybean-hydrogenated oil and fat (Spray Fat VT; product of Riken Vitamin Co., Ltd.) are put into a propeller-driven blending machine (High Speed Mixer FS-1200 type; product of Fukae Industry Co., Ltd.) and heated in a jacket filled with 80° C. water while blending. When temperature of the mixture (i.e. product temperature) rises to over 70° C. and the soybean-hydrogenated oil and fat is melted, 30° C. water is poured into the jacket to cool the mixture. Then the mixture is discharged when its temperature drops below 40° C. and passed through a sieve having 16 meshes, thus producing a feed additive of the present embodiment.

The thus produced feed additive has the appearance of white to yellowish-white crystalline powder. The average grain diameter is 430 μm and the thickness of the coating of oil and fat is about 13 μm. It contains 908 mg/g of vitamin C (by HPLC method) and not more than 0.1% of water.

By comparison between cattle given the thus produced feed additive (which is referred to as "test group") and those not given it (which is referred to as "control group"), the quality of the meat and the yield were examined in the both groups. The result is explained below. For the examination, 4 steers of Japanese Black Cattle were used in each group. The cattle in the test group were given feed mixed with 40 mg/kg of weight per day of the above feed additive for 12 months since they were 10 months old.

The result of the yield is as shown in FIG. 1. There was no statistically significant difference in the yield between the both groups. FIG. 2 shows the result of the quality of the meat. There are significant differences in the fat marbling (Shimofuri), luster, firmness and texture of the meat. Accordingly, it was proved that the feed additive of the present invention has beneficial effects on the improvement of the quality of the meat.

The improvement of the degree of the Shimofuri endows the beef with great price competitiveness in the market. According to estimates based on the result as shown in FIG. 2, the administration of the feed additive to beef cattle makes it possible that the proceeds greatly exceed its cost.

The invention claimed is:

1. A method of improving a fat marbling standard of meat by daily oral administration of oil-coated vitamin C crystalline powder to cattle, wherein:
   the oil-coated vitamin C crystalline powder contains at least 908 mg/g of vitamin C, and
   a daily dose of the vitamin C is 20 mg to 60 mg/kg of weight of the cattle.

2. The method according to claim 1, wherein the vitamin C is administered to the cattle from the middle to the later fattening stage.

3. The method according to claim 1, wherein the vitamin C is administered to the cattle since they are 10 months old.

4. A method of improving luster, firmness and texture of meat by daily oral administration of oil-coated vitamin C crystalline powder to cattle, wherein:
   the oil-coated vitamin C crystalline powder contains at least 908 mg/g of vitamin C, and
   a daily dose of the vitamin C is 20 mg to 60 mg/kg of weight of the cattle.

* * * * *